(12) United States Patent
Quaglia et al.

(10) Patent No.: US 7,032,723 B2
(45) Date of Patent: Apr. 25, 2006

(54) BRAKE ASSEMBLY WITH TUNED MASS DAMPER

(75) Inventors: Ronald Louis Quaglia, Novi, MI (US); James Leroy Swayze, S. Rockwood, MI (US); Fang Chen, Rochester Hills, MI (US); Yitzong Chern, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 278 days.

(21) Appl. No.: 10/065,471

(22) Filed: Oct. 22, 2002

(65) Prior Publication Data

US 2004/0074712 A1    Apr. 22, 2004

(51) Int. Cl.
*F16D 65/38*        (2006.01)
(52) U.S. Cl. .............................. 188/73.37; 188/250 E; 188/250 F
(58) Field of Classification Search ............. 188/73.37, 188/73.36, 73.35, 73.38, 250 R, 250 F, 250 G, 188/250 B, 250 E
See application file for complete search history.

(56) References Cited

U.S. PATENT DOCUMENTS

| 3,198,294 | A | * | 8/1965 | Stacy .......................... 188/234 |
| 4,241,819 | A | | 12/1980 | Babcock et al. |
| 4,640,390 | A | * | 2/1987 | Saumweber et al. ..... 188/73.37 |
| 4,691,810 | A | * | 9/1987 | Matsuzaki ................. 188/73.1 |
| 5,096,023 | A | * | 3/1992 | Thiel et al. .............. 188/73.36 |
| 5,416,962 | A | | 5/1995 | Passarella |
| 5,480,008 | A | * | 1/1996 | Hummel et al. ......... 188/73.37 |
| 5,515,952 | A | | 5/1996 | Jackson |
| 5,538,104 | A | * | 7/1996 | Katz et al. ................. 188/73.1 |
| 5,730,257 | A | | 3/1998 | Clark |
| 5,746,292 | A | * | 5/1998 | Tanaka et al. ........... 188/73.37 |
| 5,842,546 | A | * | 12/1998 | Biswas .................... 188/73.37 |
| 5,860,494 | A | * | 1/1999 | Nishizawa et al. ...... 188/73.35 |
| 5,887,686 | A | | 3/1999 | Tanaka et al. |
| 6,193,024 | B1 | * | 2/2001 | Heppes et al. ............. 188/73.1 |
| 6,283,258 | B1 | * | 9/2001 | Chen et al. ............. 188/250 E |
| 6,349,803 | B1 | * | 2/2002 | Brosilow ................. 188/73.37 |
| 6,427,810 | B1 | * | 8/2002 | Schorn et al. ........... 188/73.39 |
| 6,481,545 | B1 | * | 11/2002 | Yano et al. ............. 188/264 G |

FOREIGN PATENT DOCUMENTS

GB          2291684       *   1/1996

* cited by examiner

*Primary Examiner*—Devon C. Kramer
(74) *Attorney, Agent, or Firm*—Brooks Kushman P.C.; Gary A. Smith

(57) ABSTRACT

A tuned mass damper for sound-dampening brake squeal noise is located within a hole formed in a brake component such as a backplate supporting a brake pad. The location of the hole and the weight and geometry of the tuned mass damper are tailored to provide effective damping for the particular frequencies that are to be eliminated in the brake system. Locating the tuned mass damper inside of a hole in the component has packaging and manufacturing advantages, and results in a tuned mass damper that is less susceptible to damage when in use. The hole may be blind, the bottom of the hole being thin enough to serve as a spring member to which a vibration damping mass is attached. In one embodiment, the tuned mass damper is a module adapted for insertion into the hole in the brake backplate. Contact between the module and inner surfaces of the hole transfers mechanical vibration of the backplate to the tuned mass damper.

12 Claims, 3 Drawing Sheets

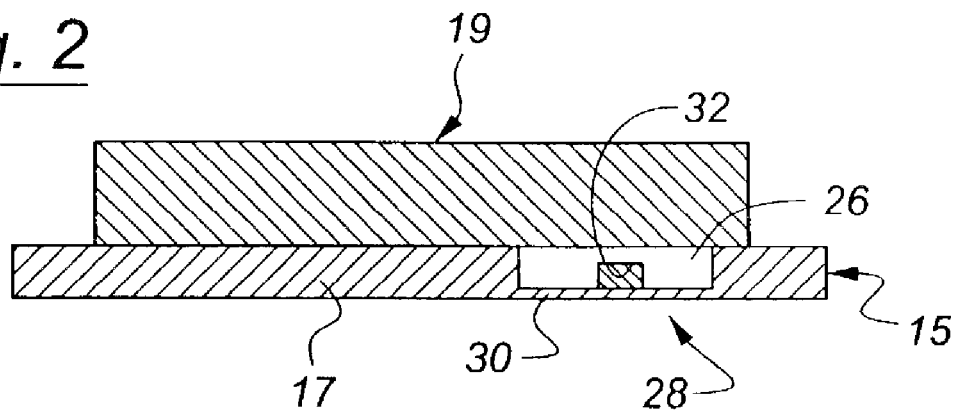
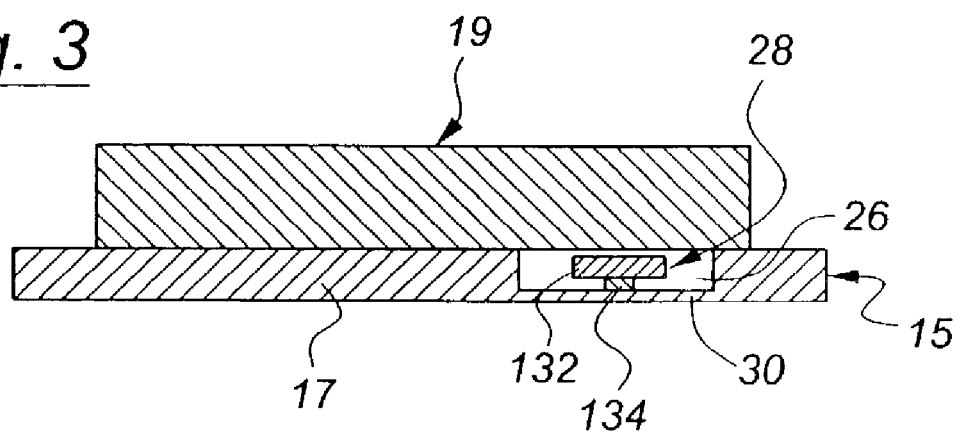
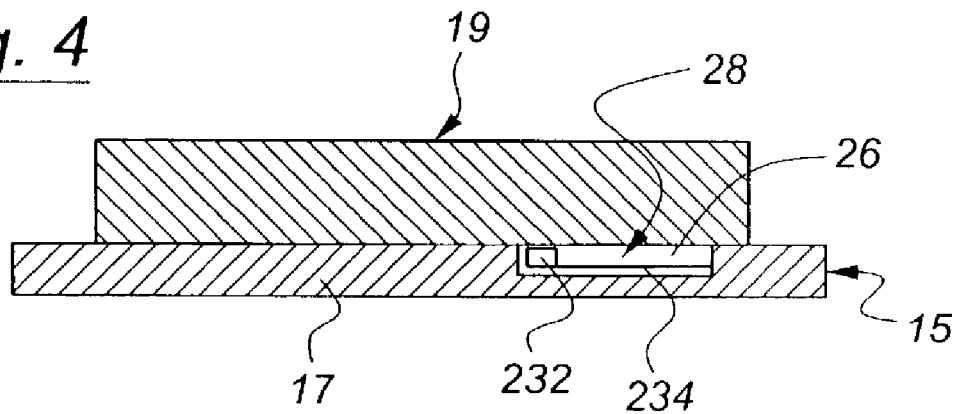

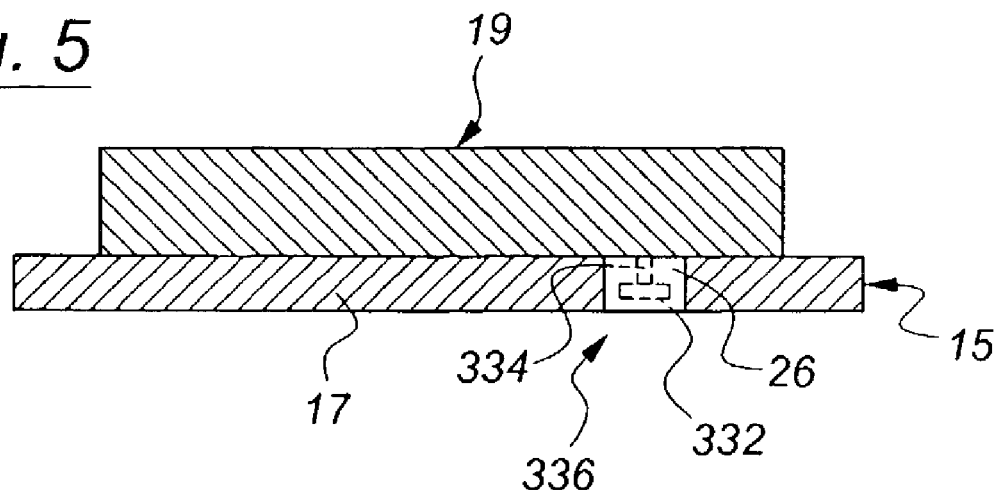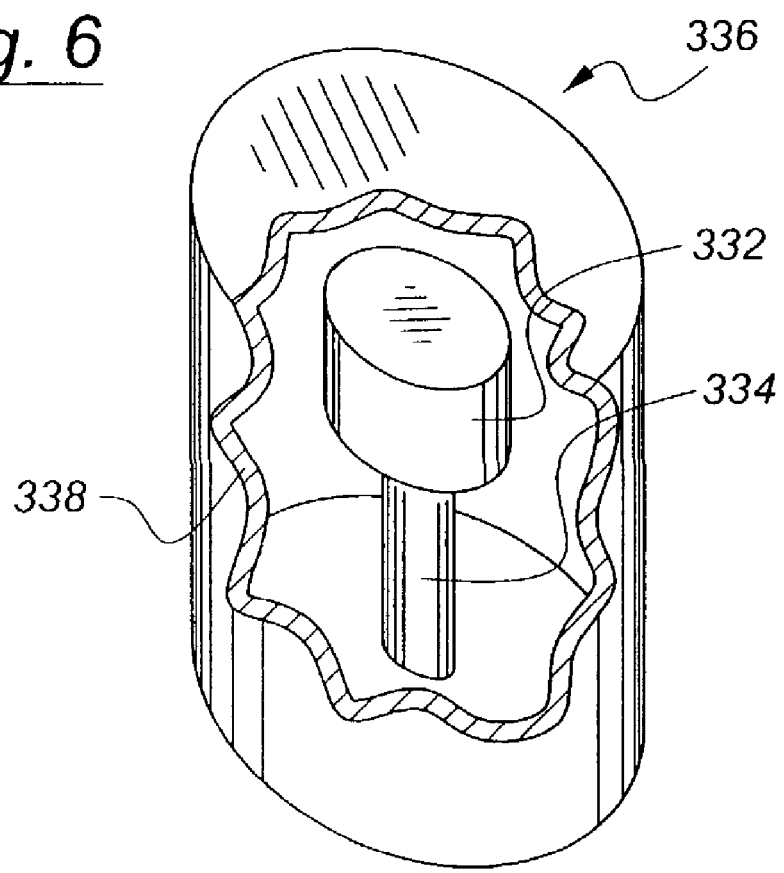

BRAKE ASSEMBLY WITH TUNED MASS DAMPER

BACKGROUND OF INVENTION

1. Field of the Invention

The present invention relates to a brake assembly with noise damping and, more particularly, to a brake assembly including a tuned mass damper located inside of a hole formed in a brake component such as a backplate.

2. Background of the Invention

In disc brake assemblies, a rotor rotates with the axle of a wheel to be braked and two friction pad structures are disposed on opposite sides of the rotor. Each friction pad structure comprises a brake pad mounted to a backplate, usually made of steel. The friction pad structures are moved inwardly, toward one another, under the force applied by a hydraulically-actuated piston and related caliper fingers of a caliper mounting structure. When the hydraulic force is released, the pad structures are moved outwardly, away from one another, by return springs.

When the pistons and caliper fingers press the backplates inwardly, the inner surfaces of the brake pads are engaged in frictional, braking contact with the rotor. A relatively high pitched and undesired brake squeal noise can be produced during such braking engagement of the pads on the rotor. The brake squeal noise is produced by vibration of the friction pad structures during braking actuation.

To reduce the undesired brake squeal noise, it is known to use sound-dampening shims positioned both between the hydraulically-actuated piston and the piston engaging surface of the related steel backplate, and also between the caliper fingers and the caliper contact surface of the related steel backplate. One such shim structure is shown in U.S. Pat. No. 5,518,088.

It has also been proposed to attach a sheet metal plate to the backplate, the sheet metal plate having a groove cut therethrough to form tuning fork members of varying length. A damping material is applied to the tuning fork members, and the lengths of the members vary in order to damp particular frequencies of vibrations. See U.S. Pat. No. 6,283,258, assigned to the assignee of the present application.

It is desirable to provide an improved apparatus for sound-dampening brake squeal noise in which the brake squeal noise is reduced, and a variety of brake squeal frequencies may be absorbed.

SUMMARY OF INVENTION

The present invention provides an improved apparatus for sound-dampening brake squeal noise by providing a brake component having a tuned mass damper located within a hole formed in the component. The location of the hole and the weight and geometry of the tuned mass damper may be adjusted to provide effective damping for the particular frequencies that are to be eliminated in the brake system. Locating the tuned mass damper inside of a hole in the component has packaging and manufacturing advantages, and results in a tuned mass damper that is less susceptible to damage when in use.

In the preferred embodiment of the invention, the brake component is a backplate attached to a brake pad that applies braking force to a disk brake rotor. The hole is blind and a thinned section of the backplate forms a bottom of the hole. The tuned mass damper may be attached directly to the bottom such that deflection of the bottom permits the vibration damping mass to oscillate relative to the backplate.

In a second embodiment, the vibration damping mass may be attached to the bottom by a column, and deflection of the column permits the vibration damping mass to oscillate relative to the backplate.

In a third embodiment of the invention, the vibration damping mass is attached to a side wall of the hole by a beam, and deflection of the beam permits the vibration damping mass to oscillate relative to the backplate.

In a fourth embodiment of the invention, the tuned mass damper is a module adapted for insertion into the hole in the brake backplate. Contact between the module and inner surfaces of the hole transfers mechanical vibration of the backplate to the tuned mass damper.

The above object and other objects, features, and advantages of the present invention are readily apparent from the following detailed description of the best mode for carrying out the invention when taken in connection with the accompanying drawings.

BRIEF DESCRIPTION OF DRAWINGS

FIG. 2 is a cross-sectional view taken along line 2—2 of FIG. 1 showing a first embodiment of the invention;

FIG. 3 is a cross-sectional view similar to FIG. 2 showing a second embodiment of the invention;

FIG. 4 is a cross-sectional view showing a third embodiment of the invention;

FIG. 5 is a cross-sectional view showing a fourth embodiment of the invention; and FIG. 6 is a perspective cut-away view of a tuned mass damper module.

DETAILED DESCRIPTION

Figure 1:
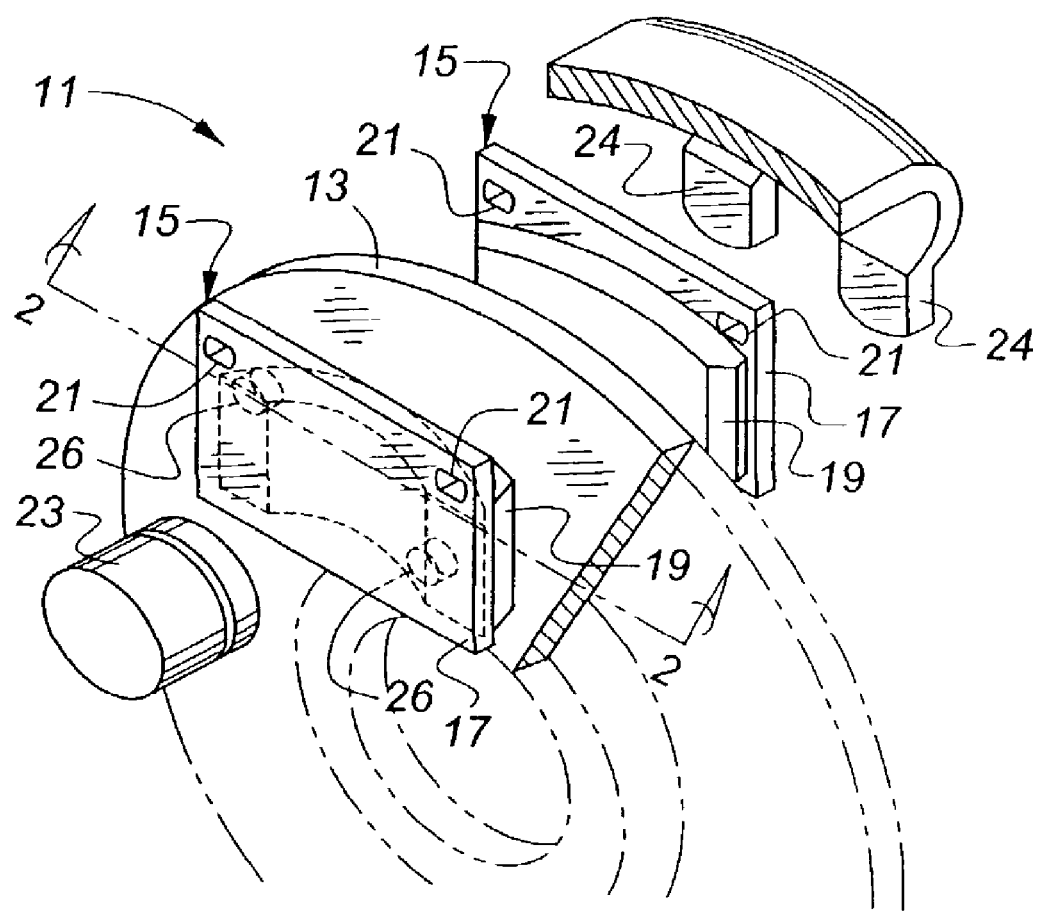
FIG. 1 is an exploded perspective view of a brake assembly in accordance with a first embodiment of the invention.

FIG. 1 is an exploded, isometric view of a disc brake apparatus indicated generally by the reference numeral 11. The disc brake apparatus 11 includes a rotatable rotor 13 that rotates with the axle of a wheel to be braked. The disc brake apparatus 11 also includes two braking components 15. Each braking component 15 comprises a backplate 17, preferably made of steel, and a brake pad 19 mounted on the rotor side of the backplate.

The two backplates 17 are suspended in a conventional caliper mounting structure (not shown) by, for example, rods that extend through openings 21 in the upper corners of the backplates 17. Such a caliper mounting permits the backplates to move axially on the support rods.

The plates are moved inwardly toward one another under forces supplied by a hydraulically actuated piston 23 and the related caliper fingers 24. When the piston 23 and fingers 24 press the backplates inwardly, the inner surfaces of the brake pads 19 are engaged in frictional, braking contact with the rotor 13.

A relatively high pitched and undesired brake squeal noise can be produced during such braking contact. The brake squeal noise is of a relatively high frequency, and is produced by vibration of the braking component 15 during braking actuation. The present invention is primarily intended to minimize or eliminate vibrations in the frequency range of approximately 1.4–16 kHz.

In order to reduce and/or eliminate the undesired brake squeal noise, holes 26 are formed in the backplates 17 and are used to mount tuned mass dampers 28. Preferably, at least one hole 26 and associated tuned mass damper 28 is provided on each of the backplates 17. The following descriptions will deal with a single hole 26 and tuned mass damper 28, but it is to be understood that any number of holes and tuned mass dampers may be provided as necessary to achieve the desired amount of vibration and noise reduction.

The hole 26 and tuned mass damper 28 are preferably located at or near the anti-node point of the operational deflection shape of the backplate 17. The operational deflection shape is the shape assumed by the backplate 17 as it deforms from its generally flat, non-excited condition due to the vibrations it experiences under normal operational conditions. The points and/or areas of maximum displacement from the at-rest condition are known as anti-nodes. The holes 26 may be located such that they are partially or completely covered by the brake pads 19 when the pads are mounted to the backplates 17.

In a first embodiment of the invention shown in FIG. 2, the hole 26 is blind, with a thinned section of the backplate 17 forming a bottom 30 of the hole. The hole 26 may be formed by any appropriate manufacturing method. The tuned mass damper 28 comprises a vibration damping mass 32 in the form of a small block of material such as steel and is attached directly to the hole bottom 30 by any appropriate method such as adhesive, heat or friction welding, etc. The hole bottom 30 serves as a spring member, deflecting when the backplate 17 is subjected to vibration so that the vibration damping mass 32 oscillates relative to the component. The mechanical properties of the tuned mass damper 28 are such that the most common and/or most undesirable vibration frequencies experienced by the backplate 17 excite the tuned mass damper, causing it to cancel all or part of the undesirable vibration.

According to a second embodiment of the invention shown in FIG. 3, the vibration damping mass 132 is attached to the hole bottom 30 by an elastic beam 134. In this embodiment, the hole bottom 30 may be thin enough such that the beam 134 and the hole bottom 30 together serve as a spring member permitting the vibration damping mass 132 to oscillate relative to the backplate 17 to cancel the unwanted vibrations. Alternatively, the hole bottom 30 may be so thick relative to the thickness of the beam 134 that the bottom 30 does not contribute significantly to the spring constant of the vibration mass damper.

According to a third embodiment of the invention shown in FIG. 4, the vibration damping mass 232 is attached to an inner surface of the hole 26 by a beam 234. In this embodiment, the beam 234 serves as a spring member permitting the vibration damping mass 232 to oscillate relative to the backplate 17 to cancel the unwanted vibrations. The hole 26 may be blind, as shown in FIG. 4, or it may be a through hole.

According to a fourth embodiment of the invention shown in FIGS. 5 and 6, the tuned mass damper takes the form of a separate module 336 that fits into a hole 26 formed in the backplate 17. The hole 26 may be blind or it may be a through hole. The module 336 is preferably generally cylindrical (but may be of any shape as long as it fits securely inside of the hole) and comprises a casing 338 preferably formed from thin steel. The casing 338 may be completely enclosed or may have one or both ends open and is press fit into the hole 26 so that there is firm contact between the inner surface of the hole 26 and the outer surface of the casing 338.

An elastic beam 334 is attached to an inner surface of the casing 338, either to one of the ends as shown or to the curved side portion. A vibration damping mass 332 is attached to the beam 334, and the beam serves as a spring member permitting the vibration damping mass 332 to oscillate relative to the backplate 17 to cancel the unwanted vibrations.

Testing has shown that a tuned mass damper according to the present invention with a vibration damping mass having a mass in the range of approximately 2–10 grams is effective to eliminate undesirable braking-related vibrations in the range of 1.4–16 kHz.

The absolute and relative dimensions of the backplates 17, holes 26, vibration damping masses 32, 132, 232, 332, beams 34, 134, 234, 334, and other components of the invention shown in the drawings are for illustrative purposes only, and are not necessarily accurate depictions of the components as they would be employed in a braking system. In a braking system application, such dimensions are established as necessary to tune the vibration characteristics of the overall brake system and eliminate or minimize unwanted noise.

While the best modes for carrying out the invention has been described in detail, those familiar with the art to which this invention relates will recognize various alternative designs and embodiments for practicing the invention within the scope of the appended claims.

The invention claimed is:

1. A backplate for mounting a brake pad of a vehicle disk brake, the backplate having at least one hole formed therein and a tuned mass damper having a mass disposed within the hole for damping vibrations associated with the operation of the vehicle disk brake and an air gap disposed between at least one surface of the tuned mass damper and the hole.

2. The apparatus according to claim 1 wherein the hole is blind, a thinned section of the backplate forming a bottom of the hole, and the tuned mass damper comprises the bottom of the hole and a mass attached directly to the bottom such that deflection of the bottom permits the tuned mass damper to oscillate relative to the backplate.

3. The apparatus according to claim 1 wherein the hole is blind, a thinned section of the backplate forming a bottom of the hole, and the tuned mass damper comprises a spring member attached to the bottom and a mass attached to the spring member, deflection of the spring member permitting the tuned mass damper to oscillate relative to the backplate.

4. The apparatus according to claim 1 wherein the tuned mass damper comprises a spring member attached to a side wall of the hole and a mass attached to the spring member, deflection of the spring member permitting the tuned mass damper to oscillate relative to the backplate.

5. The apparatus according to claim 1 wherein the tuned mass damper comprises:
   a casing adapted to be inserted into the hole such that an outer surface of the casing contacts an inner surface of the hole firmly to transfer mechanical vibration between the backplate and the casing;
   a spring member projecting from an inner surface of the casing; and
   a mass attached to the spring member.

6. The apparatus according to claim 1 wherein the hole is located at an anti-node area of an operational deflection shape.

7. A brake assembly comprising:
   a brake pad operative to apply a braking force to a brake rotor, said brake pad being subject to vibration during braking;
   a backplate attached to the brake pad, said backplate having a hole formed therein; and a tuned mass damper having a mass disposed within the hole in the backplate and attached to the backplate for damping vibrations associated with operation of the brake assembly;

wherein an air gap is disposed between at least one surface of the tuned mass damper and the hole.

8. The apparatus according to claim 7 wherein the hole is blind, a thinned section of the backplate forming a bottom of the hole, and the tuned mass damper comprises the bottom of the hole and a mass attached directly to the bottom such that deflection of the bottom permits the tuned mass damper to oscillate relative to the backplate.

9. The apparatus according to claim 7 wherein the hole is blind, a thinned section of the backplate forming a bottom of the hole, and the tuned mass damper comprises a spring member attached to the bottom and a mass attached to the spring member, deflection of the spring member permitting the tuned mass damper to oscillate relative to the backplate.

10. The apparatus according to claim 7 wherein the tuned mass damper comprises a spring member attached to a side wall of the hole and a mass attached to the spring member, deflection of the spring member permitting the tuned mass damper to oscillate relative to the backplate.

11. The apparatus according to claim 7 wherein the tuned mass damper comprises:

a casing adapted to be inserted into the hole such that an outer surface of the casing contacts an inner surface of the hole firmly to transfer mechanical vibration between the backplate and the casing;

a spring member projecting from an inner surface of the casing; and a mass attached to the spring member.

12. The apparatus according to claim 7 wherein the hole is located at an anti-node area of an operational deflection shape assumed by the backplate during application of the brakes.

* * * * *